United States Patent
Cavus et al.

(10) Patent No.: US 10,703,187 B2
(45) Date of Patent: Jul. 7, 2020

(54) APPARATUS FOR STORING ELECTRIC ENERGY FOR A MOTOR VEHICLE

(71) Applicant: Dr. Ing. h.c. F. Porsche Aktiengesellschaft, Stuttgart (DE)

(72) Inventors: Enerji Cavus, Stuttgart (DE); Philipp Trautmann, Stuttgart (DE); Alexander Klausmann, Schnönaich (DE); Mihail Sarb, Böblingen (DE); Calin Baicu, Mönsheim (DE); Philipp Schweizer, Ostelsheim (DE); Marcus Zacher, Sindelfingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/103,209

(22) Filed: Aug. 14, 2018

(65) Prior Publication Data
US 2019/0061505 A1    Feb. 28, 2019

(30) Foreign Application Priority Data
Aug. 25, 2017    (DE) .......................... 10 2017 119 466

(51) Int. Cl.
*B60K 1/04*    (2019.01)
*B60L 50/64*    (2019.01)
(Continued)

(52) U.S. Cl.
CPC ............... *B60K 1/04* (2013.01); *B60L 50/64* (2019.02); *H01M 2/1077* (2013.01);
(Continued)

(58) Field of Classification Search
CPC .............. B60K 1/04; B60K 2001/0438; B60K 2001/0455; B60L 50/66
See application file for complete search history.

(56) References Cited

U.S. PATENT DOCUMENTS 9,061,712 B2 * 6/2015 Patberg ................ B62D 21/157
9,985,258 B2    5/2018 Hara et al.
(Continued)

FOREIGN PATENT DOCUMENTS

DE    102011051698 A1    1/2013
DE    102015202907 A1    8/2015
(Continued)

OTHER PUBLICATIONS

German Search Report for German Application No. 10 2017 119 466.5, dated May 29, 2018, with partial English translation—7 pages.
(Continued)

*Primary Examiner* — Brian L Swenson
(74) *Attorney, Agent, or Firm* — RatnerPrestia

(57) ABSTRACT

An apparatus for storing electric energy for a motor vehicle includes a plurality of energy storage modules and a main body which can be fastened to the motor vehicle. Each energy storage module includes energy storage for storing the electric energy and a carrier, in which the energy storage is arranged. The carrier is fastened in an individually detachable manner to the main body in the state in which it is fastened to the motor vehicle, with the result that a first one of the energy storage modules can be removed from the apparatus without it being necessary for the carrier of a second one of the energy storage modules to be detached from the main body.

13 Claims, 9 Drawing Sheets

(51) Int. Cl.
*H01M 10/6556* (2014.01)
*H01M 10/625* (2014.01)
*H01M 2/10* (2006.01)
*B60L 50/60* (2019.01)
*B60K 11/02* (2006.01)
*H01M 10/647* (2014.01)
*B60K 1/00* (2006.01)
*H01M 2/02* (2006.01)

(52) U.S. Cl.
CPC ....... *H01M 2/1083* (2013.01); *H01M 2/1094* (2013.01); *H01M 10/625* (2015.04); *H01M 10/6556* (2015.04); *B60K 11/02* (2013.01); *B60K 2001/005* (2013.01); *B60K 2001/0438* (2013.01); *B60K 2001/0455* (2013.01); *B60K 2001/0472* (2013.01); *B60L 50/66* (2019.02); *H01M 2/0207* (2013.01); *H01M 10/647* (2015.04); *H01M 2220/20* (2013.01)

(56) References Cited

U.S. PATENT DOCUMENTS

| | | | | |
|---|---|---|---|---|
| 10,044,079 B2* | 8/2018 | Kim | .................... | H01M 10/625 |
| 10,062,876 B2* | 8/2018 | Wuensche | ............... | B60L 58/12 |
| 10,099,546 B2* | 10/2018 | Hara | ....................... | B60L 50/66 |
| 10,131,381 B2* | 11/2018 | Ashraf | .................... | B60K 1/04 |
| 10,160,492 B2* | 12/2018 | Fees | ......................... | B60K 1/04 |
| 10,173,511 B2* | 1/2019 | Hara | ....................... | B60K 1/04 |
| 10,232,697 B2* | 3/2019 | Hara | ....................... | B60K 1/04 |
| 2014/0060944 A1* | 3/2014 | Fillion | .................... | B60K 1/04 |
| | | | | 180/65.31 |
| 2015/0243950 A1 | 8/2015 | Hara et al. | | |
| 2017/0005371 A1* | 1/2017 | Chidester | ............ | H01M 10/425 |
| 2017/0149035 A1 | 5/2017 | Sham | | |
| 2018/0013110 A1* | 1/2018 | Wuensche | ............ | H01M 10/613 |

FOREIGN PATENT DOCUMENTS

| | | |
|---|---|---|
| EP | 3223341 A1 | 9/2017 |
| JP | 2015157584 A | 9/2015 |
| KR | 20120079858 A | 7/2012 |
| KR | 20130032600 A | 4/2013 |

OTHER PUBLICATIONS

English Translation of the Korean Office Action for Korean Application No. 10-2018-0097776, dated Oct. 21, 2019, 7 pages.
English Translation of the Korean Office Action for Korean Application No. 10-2018-0097776, dated Apr. 13, 2020, 4 pages.

\* cited by examiner

APPARATUS FOR STORING ELECTRIC ENERGY FOR A MOTOR VEHICLE

CROSS-REFERENCE TO RELATED APPLICATION

This application claims priority to German Patent Application No. DE 10 2017 119 466.5, filed Aug. 25, 2017, which is incorporated by reference herein in its entirety.

FIELD OF THE INVENTION

The present invention relates to an apparatus for storing electric energy for a motor vehicle.

BACKGROUND OF THE INVENTION

Apparatuses of this type are used for an electric drive of motor vehicles. Apparatuses are known from the prior art, in the case of which apparatuses the replacement of individual modules in the case of a defect is relatively complicated. A plurality of energy storage modules always have to be removed from the motor vehicle, even if actually only one is defective and is to be replaced.

DE 10 2015 202 907 A1, which is incorporated by reference herein, has disclosed a vehicle battery which has a receiving housing which comprises an upper and a lower receiving unit. Moreover, the vehicle battery comprises battery modules which in each case comprise battery cells. At least one battery module is accommodated in each case in the upper receiving unit and the lower receiving unit. If a load acts on the upper receiving unit, the upper and the lower receiving unit can be separated from one another. The upper receiving unit can then be moved away from the lower receiving unit.

SUMMARY OF THE INVENTION

In view of the foregoing, described herein is an apparatus with lower repair complexity, as well as a method for reducing the repair complexity.

The apparatus comprises a plurality of energy storage modules and a main body which can be fastened to the motor vehicle. The energy storage modules in each case comprise energy storage means, for storing the electric energy and a carrier means. The energy storage means can also be called energy storage cells. The energy storage means are arranged in the carrier means. In the state of the main body, in which state it is fastened to the motor vehicle, the carrier means can be fastened to the main body such that they can be detached individually. Within the context of this description, this is understood to mean, in particular, that the carrier means can be detached in each case individually from the main body, while the main body is fastened to the motor vehicle. For example, the carrier means can be screwed fixedly to the main body. The screwed connection of an individual one of the carrier means can be detached independently of the other carrier means, while the main body is fastened to the motor vehicle. Therefore, a first one of the energy storage modules can be removed from the apparatus without it being necessary for the carrier means of a second one of the energy storage modules to be detached from the main body. Therefore, in the case of defect, merely the defective energy storage module can be exchanged simply, without it being necessary for other energy storage modules or even the entire main body to be dismantled. The repair complexity is reduced significantly in this way.

In accordance with one embodiment of the invention, all the carrier means can be capable of being fastened to the main body such that they can be detached individually. This can mean, in particular, that each energy storage module can be removed from the apparatus without it being necessary for the carrier means of another energy storage module to be detached from the main body.

In accordance with one embodiment of the invention, the apparatus can comprise connecting means. In each case two of the energy storage modules can be capable of being connected to one another by way of one of the connecting means in the state in which they are fastened to the main body. Said connection of the energy storage modules to one another can be detached particularly simply.

In accordance with one embodiment of the invention, the energy storage modules can comprise in each case two electric contact means. The electric contact means of two adjacent ones of the energy storage modules can be capable of being connected electrically to one another by way of the connecting means. The two adjacent energy storage modules can thus be connected electrically and mechanically to one another by way of a single component.

In accordance with one embodiment of the invention, the energy storage means can be fastened in each case in a non-positive manner to the carrier means. For example, a wedge can be arranged between the energy storage means. In addition, a corresponding wedge can also be arranged adjacently with respect to the wedge, with the result that the energy storage means are clamped in the carrier means.

In accordance with one embodiment of the invention, the main body can comprise at least one cable harness. The cable harness can run, for example, in a cavity of the main body. The cable harness is configured for making contact with the energy storage means. The cable harness is configured for the transmission of control signals to the energy storage means. The energy storage means can be capable of being connected or can be connected electrically to the cable harness via a plug-in connection, for example. Here, within the context of this description, a control signal is understood to mean, in particular, an electric signal which is configured for controlling the energy storage means. It can be, for example, a switch-on or switch-off signal. Information can also be transmitted from the energy storage means via the cable harness (for example, the current charging state).

In accordance with one embodiment of the invention, the carrier means can in each case comprise a coolant duct which is configured to conduct coolant for cooling the energy storage means.

In accordance with one embodiment of the invention, the apparatus can comprise a sealing plate which seals off the energy storage modules in a watertight manner with respect to the surroundings at least on one side. The sealing plate can comprise leadthroughs, through which the coolant connectors can be routed. The coolant ducts can be connected fluidically to the coolant connectors in the state in which the coolant connectors are led through. A reliable sealing action can be achieved in this way, it being possible at the same time for the coolant circuit to be interrupted with little complexity, in order, for example, to replace an energy storage module, by the coolant connectors being disconnected from the coolant ducts.

The coolant connectors can be capable of being connected to a coolant circuit via quick action connecting elements. The quick action connecting elements preferably seal the coolant connectors automatically when the coolant connectors are disconnected from the coolant circuit.

It is possible that the sealing plate is of particularly impact resistant configuration, with the result that it protects the remaining components of the apparatus against damage by way of impact effects. This is particularly advantageous if the apparatus is mounted below a motor vehicle.

As an alternative to this, the apparatus can comprise an impact protection plate which is arranged on that side of the sealing plate which faces away from the energy storage modules. Said impact protection plate can be of particularly impact resistant configuration, with the result that it protects the remaining components of the apparatus against damage by way of impact effects. This is particularly advantageous if the apparatus is mounted below a motor vehicle.

In accordance with one embodiment of the invention, the main body can be of frame-like configuration. This shape is particularly weight-saving and stable.

The method described herein relates to the removal of a single energy storage module of the energy storage modules from an apparatus in accordance with one embodiment of the invention in the state in which the apparatus is fastened to the motor vehicle. The carrier means of said single energy storage module is detached from the main body. In the meantime, the remaining carrier means remain connected to the main body.

BRIEF DESCRIPTION OF THE DRAWING

Further features and advantages of the present invention become clear using the following description of preferred exemplary embodiments with reference to the appended figures. Here, the same designations are used for identical or similar elements and for components with identical or similar functions.

DETAILED DESCRIPTION OF THE INVENTION

Figure 1:
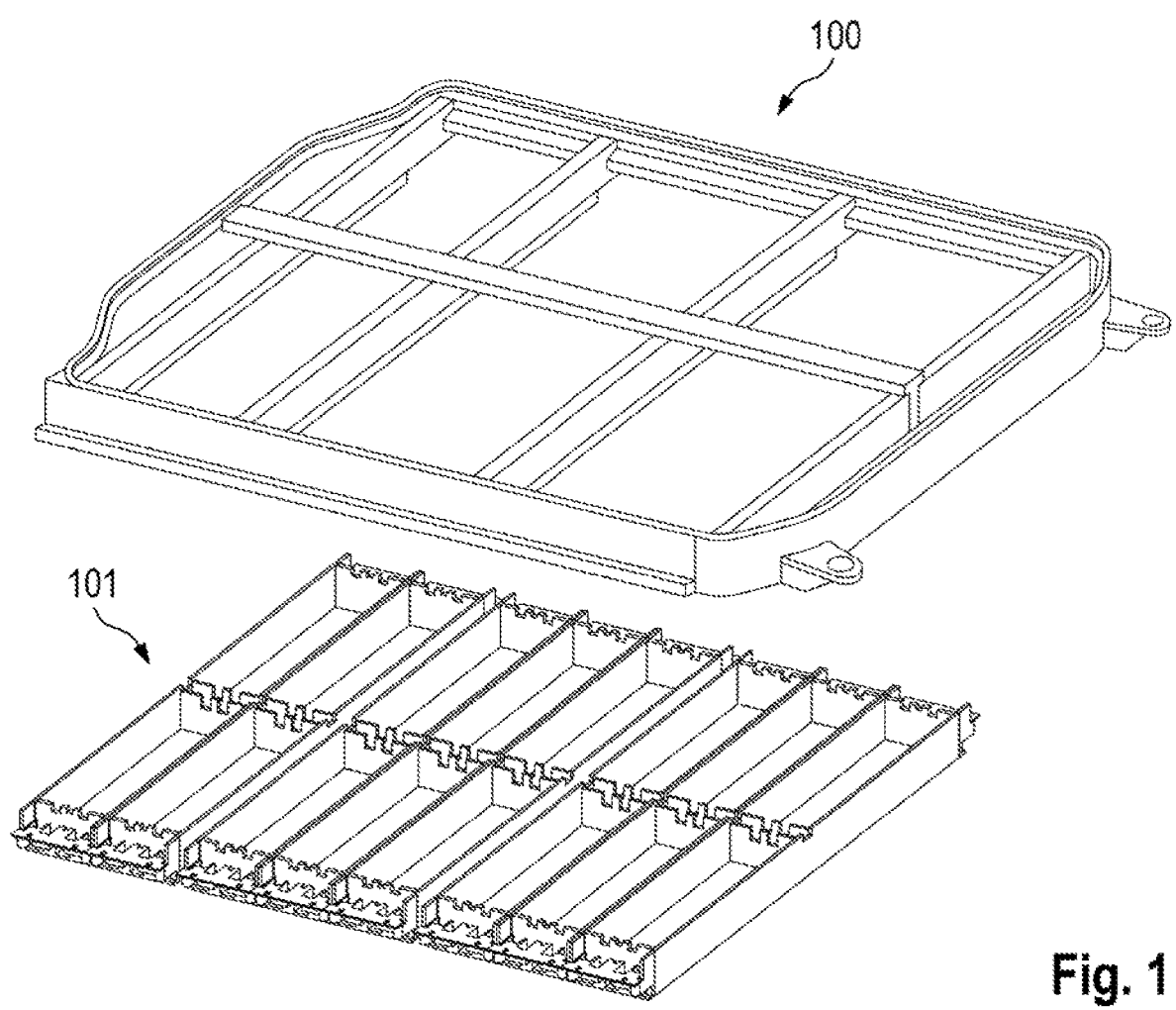
FIG. 1 shows a diagrammatic perspective view of a plurality of carrier means and a main body of an apparatus in accordance with one embodiment of the invention.
Figure 2:
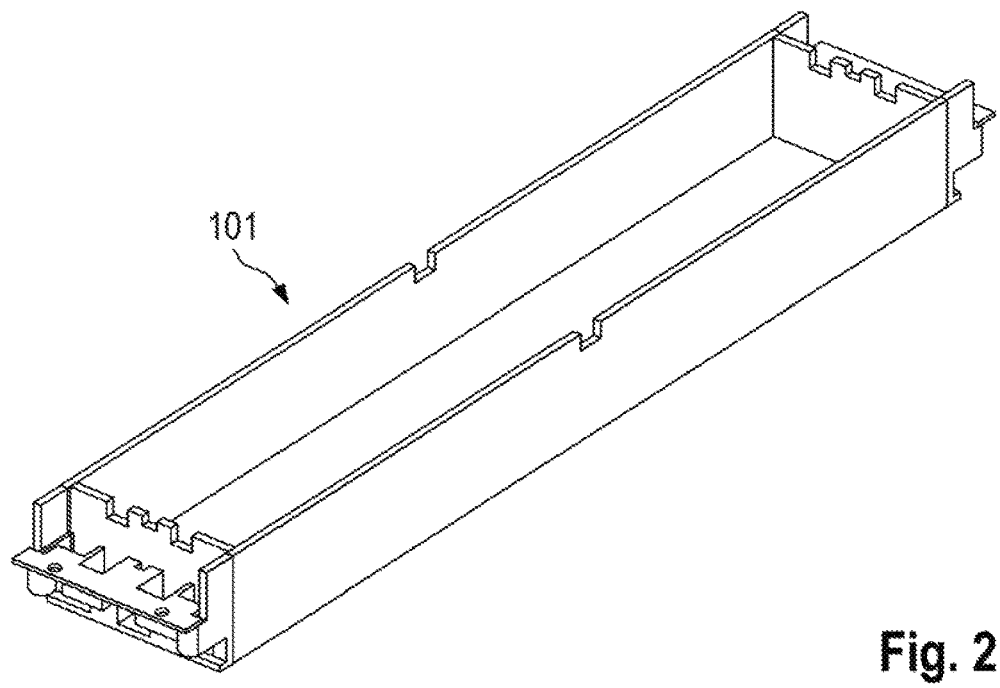
FIG. 2 shows a diagrammatic perspective detailed view of a carrier means in accordance with one embodiment of the invention.
Figure 3:
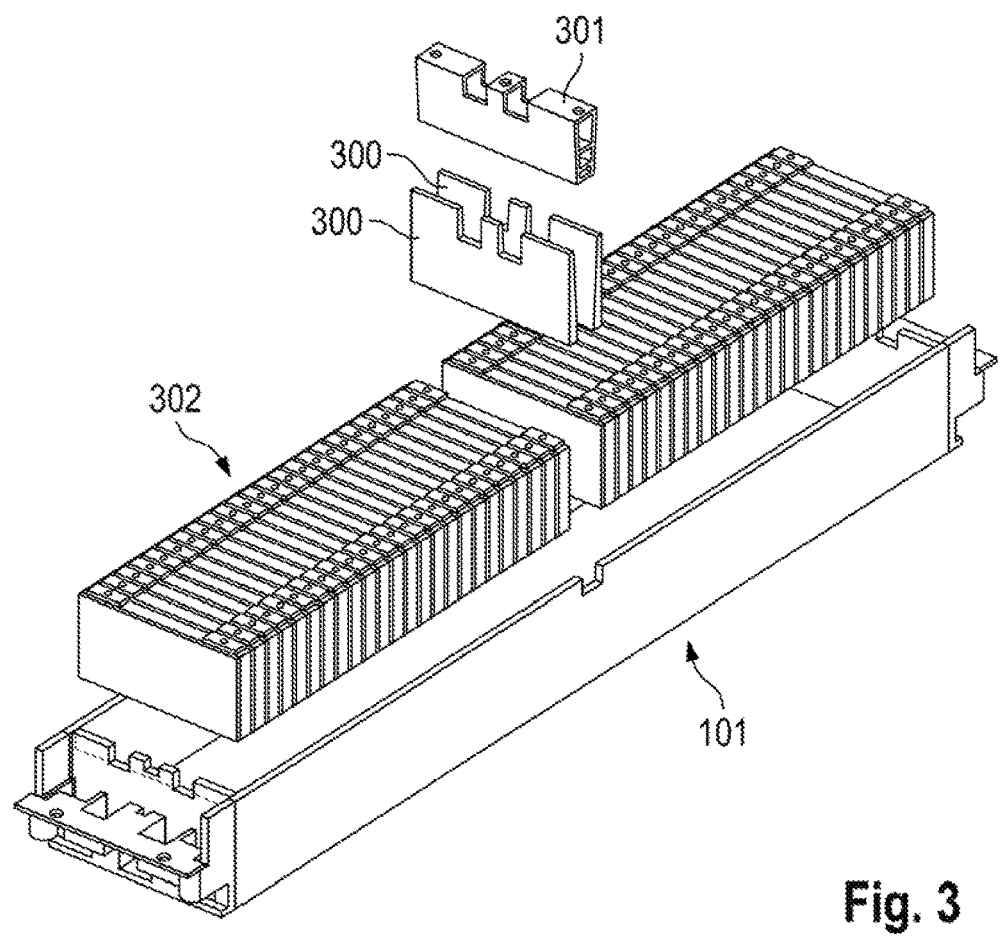
FIG. 3 shows a diagrammatic perspective view of the carrier means from FIG. 2 and energy storage means which can be arranged therein.

The apparatus comprises a frame-like main body 100 and a plurality of carrier means 101 which can be arranged on the main body 100 and can be fastened to it. A plurality of energy storage means 302 which are configured for storing electric energy are arranged in each case in the carrier means 101. The energy storage means 302 can be, for example, accumulators, batteries and/or rechargeable batteries. The carrier means 101 can be, for example, polygonal shaped receptacles or boxes having an open top end and defining one or more interior regions that are sized for receiving carrier means 101. The energy storage means 302 are connected to the respective carrier means 101 in a non-positive manner. For this purpose, two wedges 300 and a corresponding wedge 301 are provided, with the result that the wedges 300, the corresponding wedge 301 and the energy storage means 302 are clamped in the carrier means and a prestressing force acts on them.

Figure 4:
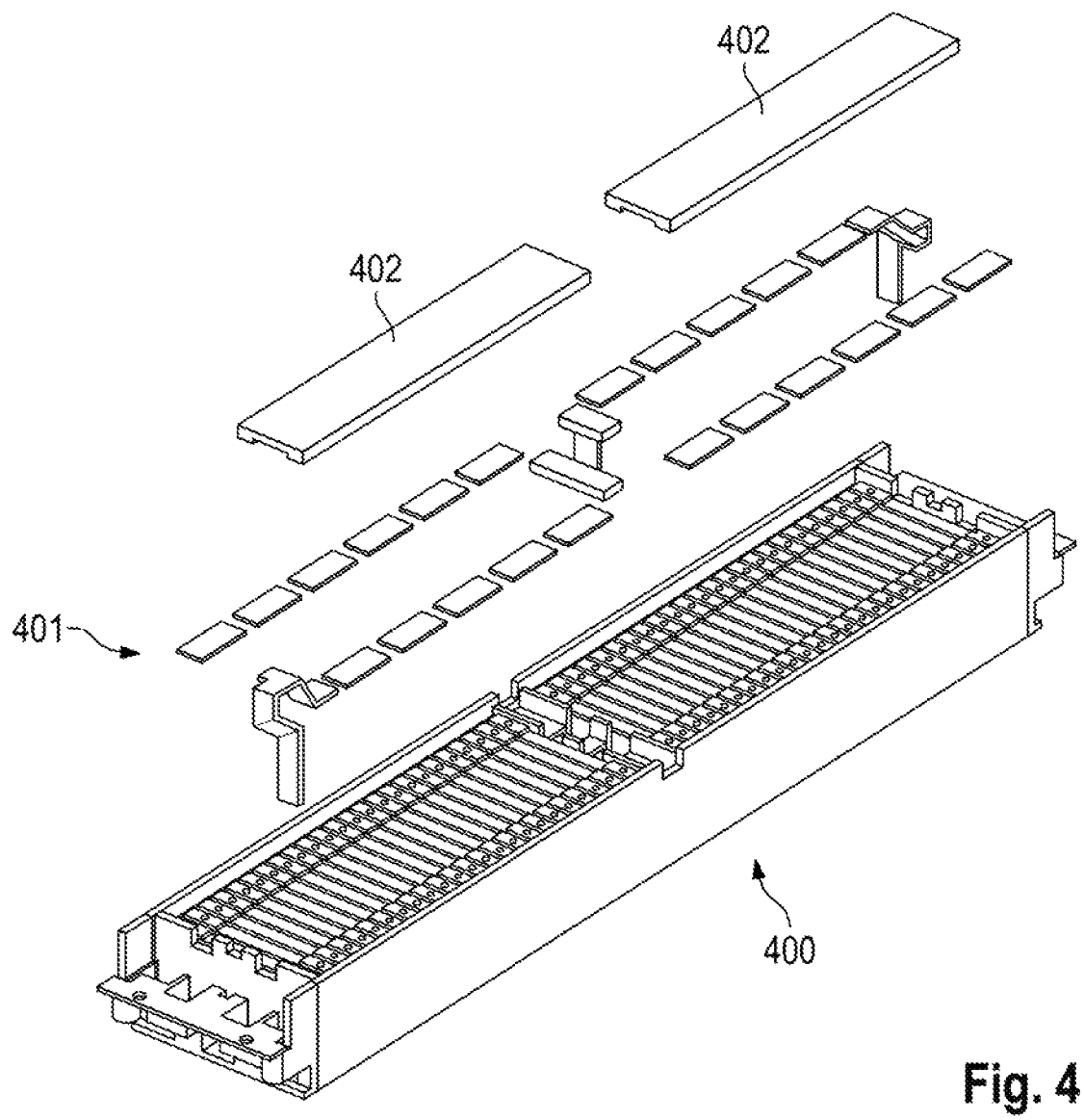
FIG. 4 shows a diagrammatic perspective view of an energy storage module in accordance with one embodiment of the invention.

The combination of the carrier means 101 and the energy storage means 302 which are arranged therein can be called an energy storage module 400. Moreover, the energy storage module 400 which is shown in FIG. 4 comprises electrically conducting rail elements 401 (also referred to herein as electric contact means), to which the energy storage means 302 are connected electrically. Moreover, the energy storage module 400 comprises covers 402 which are configured to cover a cable 900 (see FIG. 9).

Figure 5:
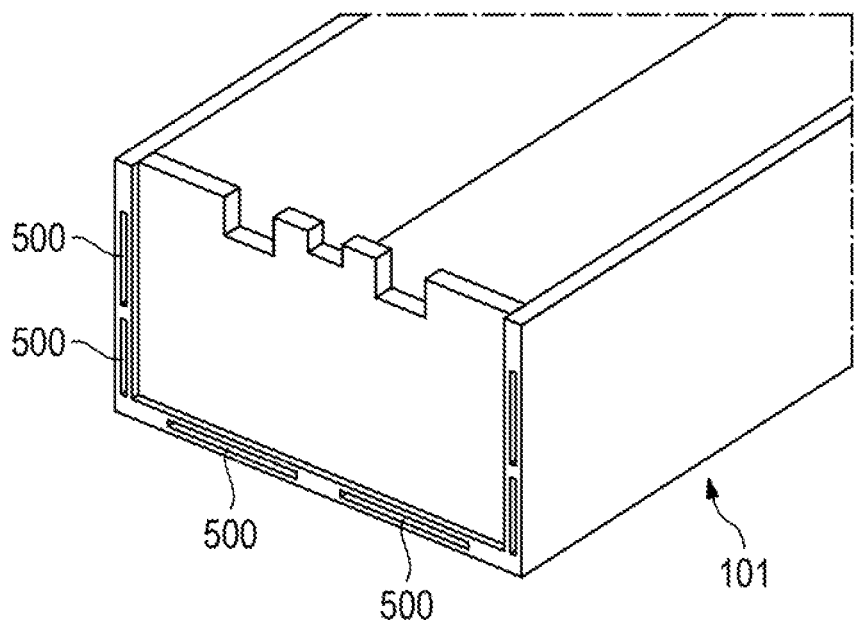
FIG. 5 shows a diagrammatic perspective view of a carrier means with coolant ducts.
Figure 6:
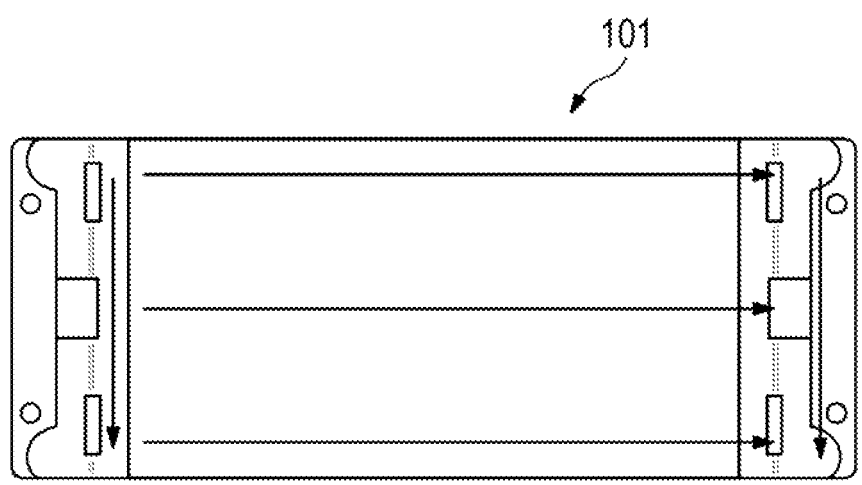
FIG. 6 shows a diagrammatic plan view of the carrier means from FIG. 5.

FIG. 5 shows a carrier means 101 with a plurality of coolant ducts 500. A coolant can flow through the coolant ducts 500, in order to reduce the risk of overheating of the energy storage means 302. FIG. 6 shows the carrier means 101 from FIG. 5. The flow direction of the coolant in the coolant ducts 500 is illustrated by way of arrows.

Figure 7:
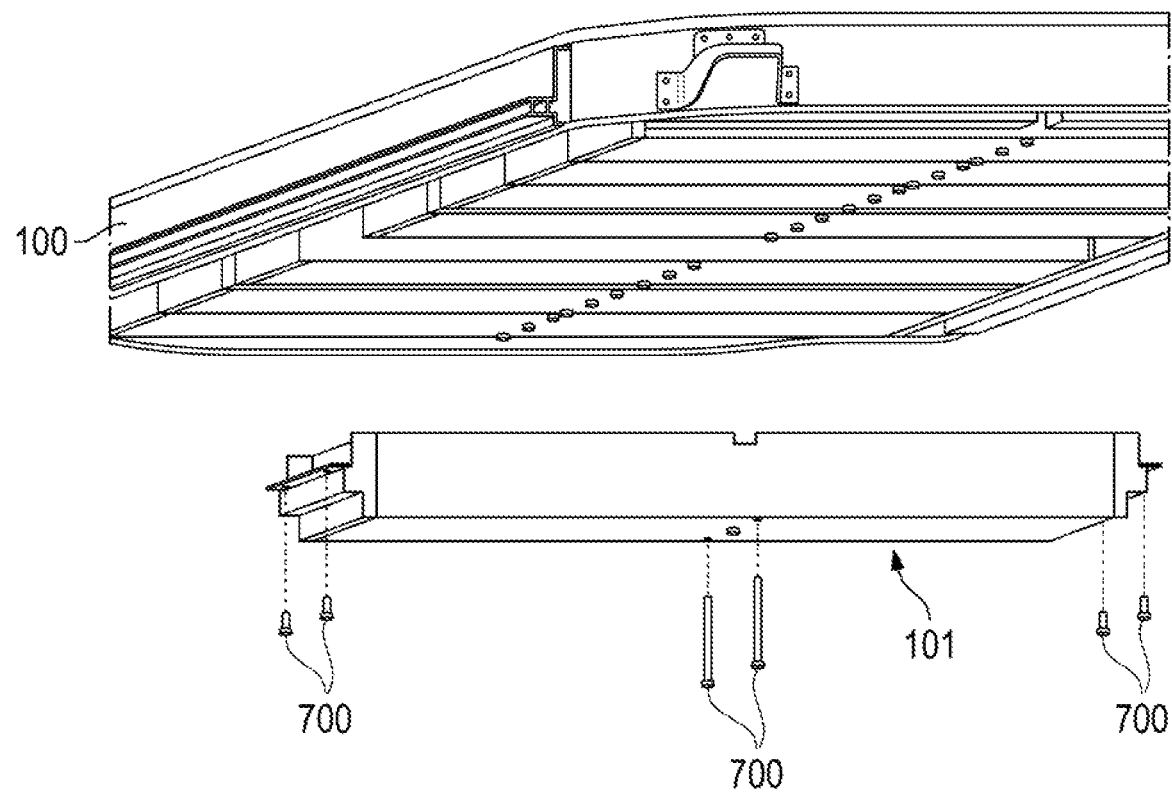
FIG. 7 shows a diagrammatic perspective view of a plurality of carrier means which are fastened to a main body, and of a carrier means which is still to be fastened to the main body.

FIG. 7 shows how a single carrier means 101 can be fastened to the main body 100 by way of screws 700. Conversely, this means that the carrier means 101 can also be detached individually from the main body 100, without it being necessary for the other carrier means 101 to be detached from the main body.

Figure 8A:
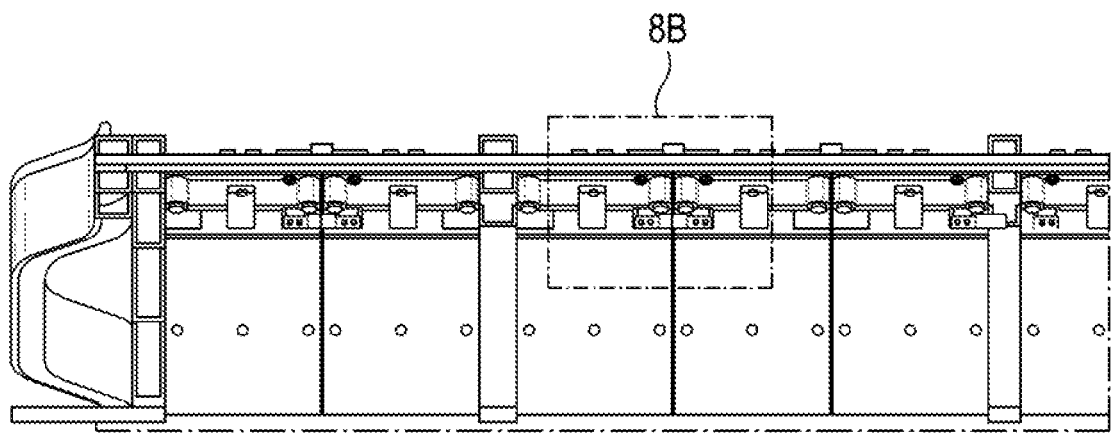
FIG. 8A shows a diagrammatic side view of a plurality of energy storage modules which are connected to one another in accordance with one embodiment of the invention.
Figure 8B:
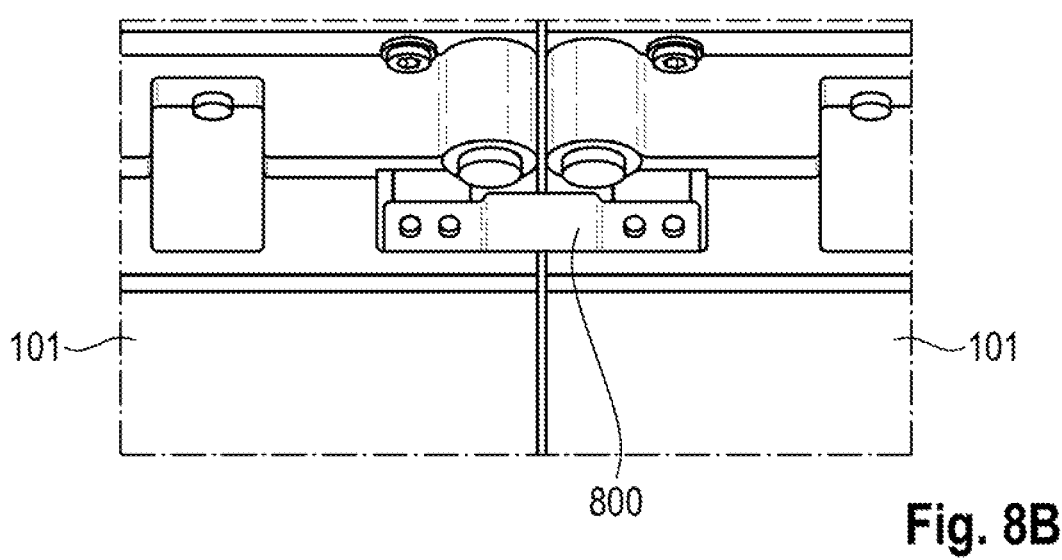
FIG. 8B shows an enlarged detail from FIG. 8A.
Figure 9:
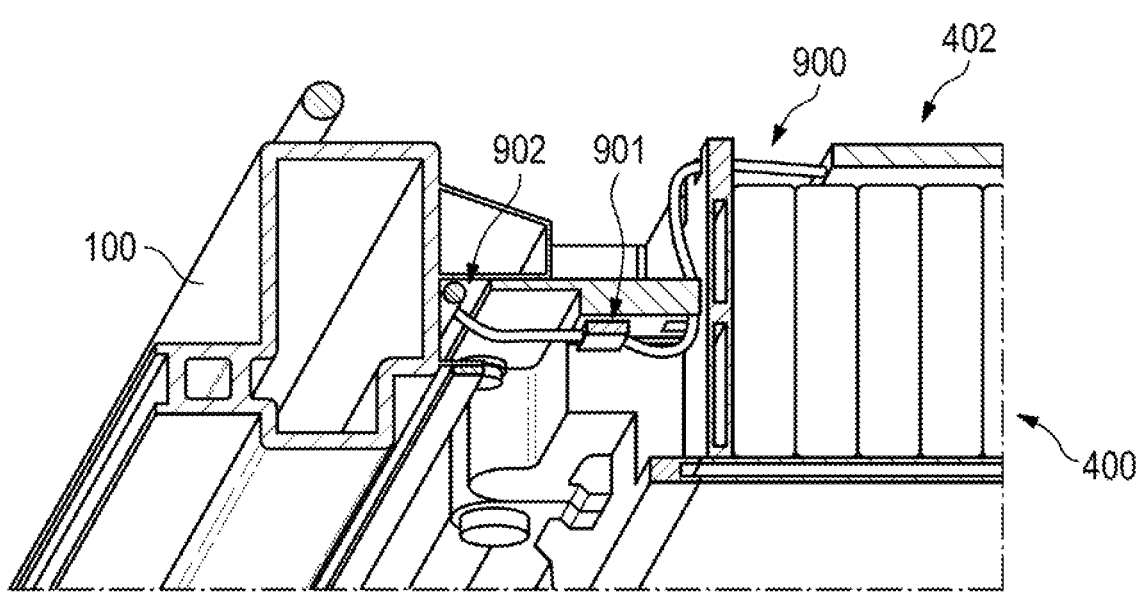
FIG. 9 shows a diagrammatic sectional view of an apparatus in accordance with one embodiment of the invention with a cable harness for the transmission of control signals.
Figure 10A:
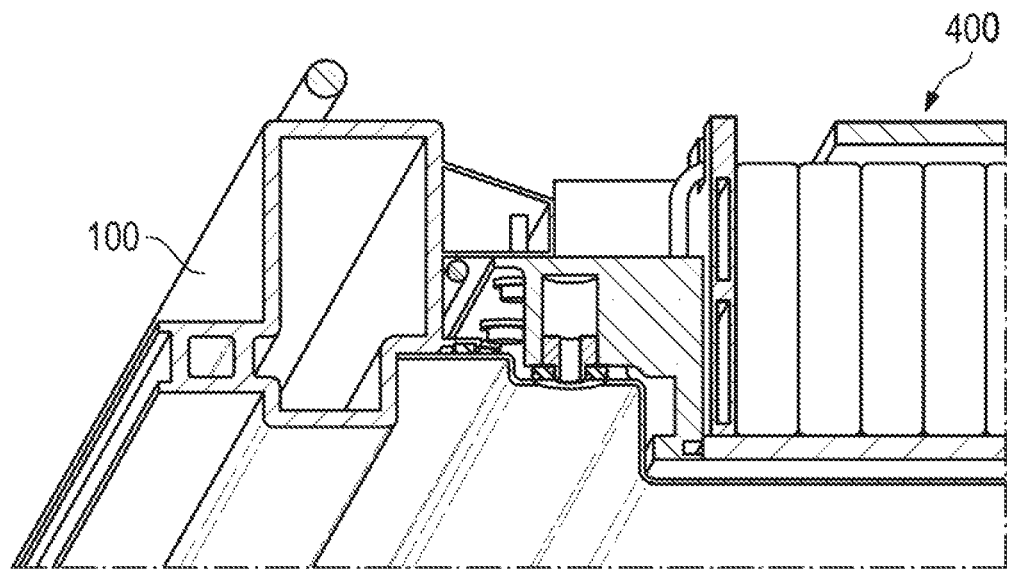
FIG. 10A shows a diagrammatic sectional view of an apparatus in accordance with one embodiment of the invention with a sealing plate.
Figure 10B:
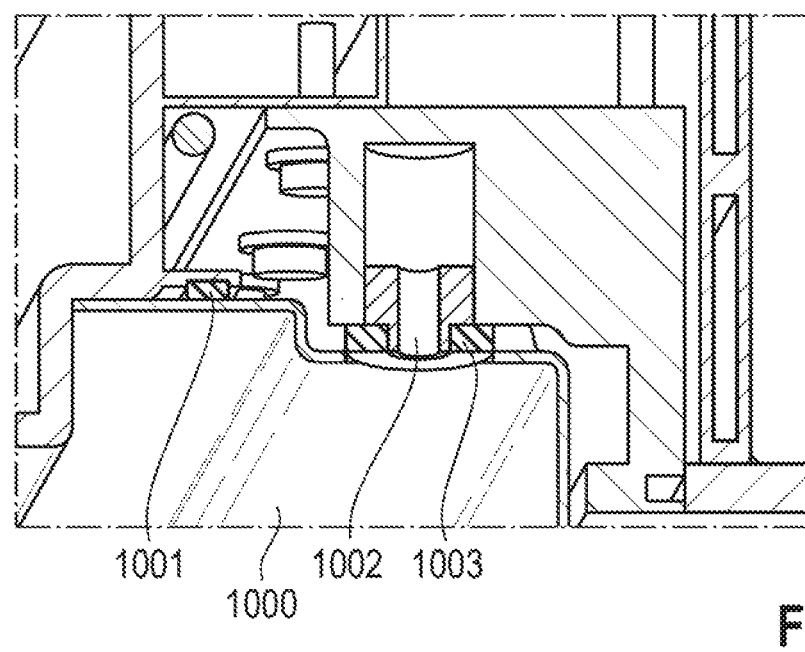
FIG. 10B shows an enlarged detail from FIG. 10A.
Figure 11:
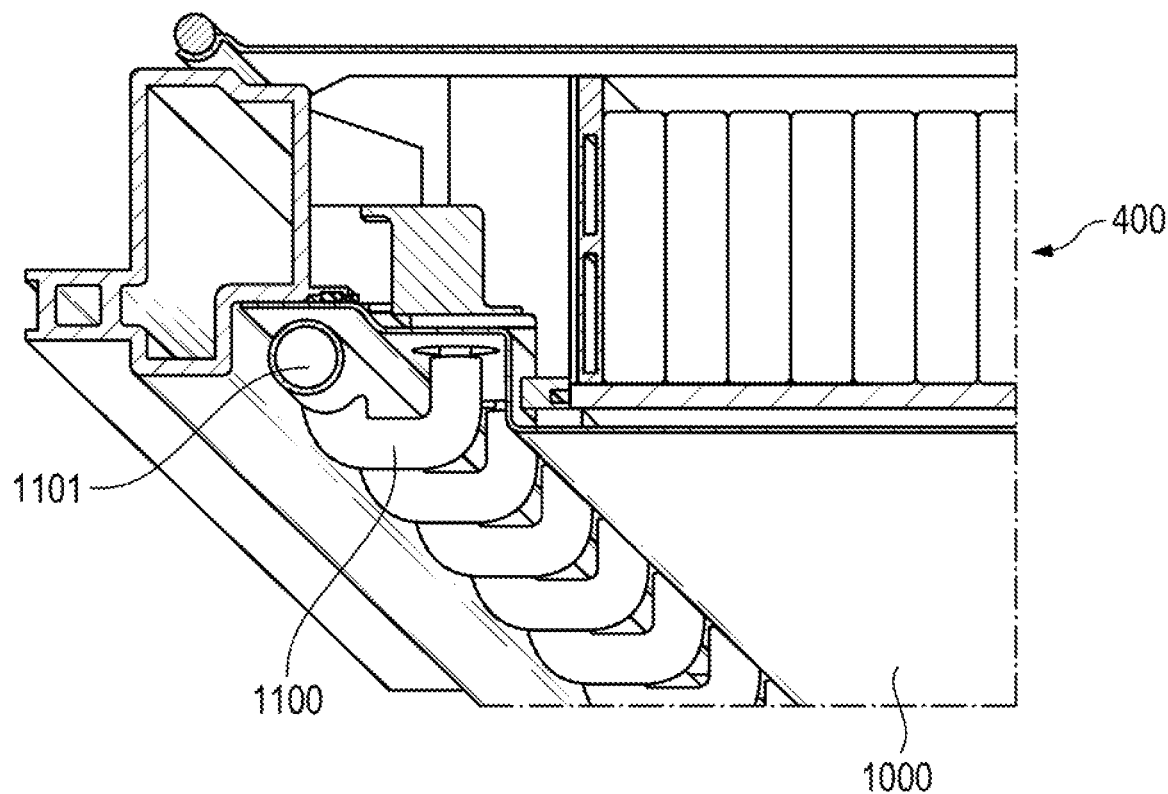
FIG. 11 shows a diagrammatic sectional view of an apparatus in accordance with one embodiment of the invention with a coolant circuit.

The electric connectors of the energy storage module 400 are shown in FIGS. 8A, 8B and 9. A connecting means 800 is provided, by way of which two adjacent carrier means 101 are connected. Said connecting means 800 also connects the rail elements 401 of the two adjacent carrier means 101 to one another electrically. The energy storage means 302 are connected via a cable 900 and a plug-in connection 901 to a cable harness 902. Via said connection, control signals can be transmitted to the energy storage means 302. It is also possible that information from the energy storage means 302, such as the charging state, can be read out via said connection. The connection means 800 may be a bracket, clip, clamp, and/or fastener(s).

A sealing plate 1000 is provided to seal the energy storage modules 400 against contaminants and spray water. Here, a circumferential seal 1001 is arranged between the main body 100 and the sealing plate 1000. Coolant connectors 1002 protrude through recesses of the sealing plate 1000. Annular seals 1003 are arranged in the recesses, in order to also achieve a reliable sealing action here. The coolant connectors 1002 can be connected to a coolant circuit 1101 via quick action connectors 1100, with the result that coolant can flow through the coolant ducts 500 of the carrier means 101.

If the main body 100 is fastened, for example, to the undertray of a motor vehicle, a single energy storage module 400 can be removed from the apparatus in a simple way. To this end, first of all the appropriate quick action connector 1100 is released and the sealing plate 1000 is removed from the main body 101. Subsequently, the connecting means 800 and the plug-in connection 901 are released. The screws 700, by way of which the carrier means 101 is fastened to the main body 100, are likewise released. Subsequently, the energy storage module 400 can be removed from the main body 100, without it being necessary for electric or mechanical connections of other energy storage modules 400 to be released. The removed energy storage module 400 can then be replaced by another and/or can be repaired.

What is claimed is:

1. An apparatus for storing electric energy for a motor vehicle, comprising:
    a plurality of energy storage modules and a main body which is configured to be fastened to the motor vehicle, each energy storage module comprising energy storage means for storing the electric energy and a carrier means, in which the energy storage means are arranged,
    wherein each carrier means is configured to be fastened in an individually detachable manner to the main body in a state in which the main body is fastened to the motor vehicle, with the result that a first one of the energy storage modules is configured to be removed from the apparatus without it being necessary for the carrier means of a second one of the energy storage modules to be detached from the main body,
    wherein, for each energy storage module, the energy storage means are fastened with a wedge to clamp the energy storage means to the carrier means.

2. The apparatus as claimed in claim 1, wherein the apparatus comprises connecting means, wherein two of the energy storage modules are configured to be connected to one another by way of one of the connecting means in the state in which the energy storage modules are fastened to the main body.

3. The apparatus as claimed in claim 2, wherein each energy storage module comprises two electric contact means the electric contact means of two adjacent ones of the energy storage modules are configured to be connected to one another electrically by way of the connecting means.

4. The apparatus as claimed in claim 1, wherein the main body comprises at least one cable harness which is configured for making contact with the energy storage means, the cable harness being configured for the transmission of control signals to the energy storage means.

5. The apparatus as claimed in claim 1, wherein each carrier means comprises a coolant duct which is configured to conduct coolant for cooling the energy storage means.

6. The apparatus as claimed in claim 5, wherein the apparatus comprises a sealing plate which seals off the energy storage modules in a watertight manner with respect to the surroundings at least on one side, the sealing plate comprising leadthroughs, through which coolant connectors can be routed, the coolant ducts being connected fluidically to the coolant connectors in a state in which the coolant connectors are led through.

7. The apparatus as claimed in claim 5, wherein the coolant duct is formed in a wall of each carrier means.

8. The apparatus as claimed in claim 1, wherein the main body is a frame.

9. The apparatus as claimed in claim 1, wherein the plurality of batteries or accumulators are pre-stressed against other another.

10. The apparatus as claimed in claim 1, wherein the plurality of batteries or accumulators are sandwiched together.

11. In an apparatus for storing electric energy for a motor vehicle including a plurality of energy storage modules and a main body which is configured to be fastened to the motor vehicle, each energy storage module including (i) energy storage means for storing the electric energy comprising a plurality of batteries or accumulators, and (ii) a carrier means in which the energy storage means are removably positioned and arranged in a row, a method for removing precisely one individual energy storage module of a plurality of energy storage modules, said method comprising:
    detaching the carrier means of said individual energy storage module, along with the energy storage means of said individual energy storage module, from the main body while the remaining carrier means remain connected to the main body,
    wherein prior to the detaching step, the method comprises, for each energy storage module, fastening the energy storage means with a wedge to clamp the energy storage means to the carrier means.

12. The apparatus as claimed in claim 11, wherein the plurality of batteries or accumulators are pre-stressed against other another.

13. The apparatus as claimed in claim 11, wherein the plurality of batteries or accumulators are sandwiched together.

* * * * *